United States Patent [19]

Sato et al.

[11] Patent Number: 4,572,828

[45] Date of Patent: Feb. 25, 1986

[54] METHOD FOR PRODUCING SILICON NITRIDE SINTERED BODY OF COMPLEX SHAPE

[75] Inventors: Nobuhiro Sato; Yuji Katsura; Haruyuki Ueno, all of Kitakyushu, Japan

[73] Assignee: Kurosaki Refractories Co., Ltd., Kitakyushu, Japan

[21] Appl. No.: 701,425

[22] Filed: Feb. 14, 1985

[30] Foreign Application Priority Data

Feb. 16, 1984 [JP] Japan .................................. 59-28145

[51] Int. Cl.$^4$ ..................... C01B 21/063; C04B 35/58; C04B 37/00
[52] U.S. Cl. ..................... 423/344; 156/89; 264/59; 264/65; 264/82; 501/97
[58] Field of Search ............... 264/65, 82, 59; 156/89; 423/344

[56] References Cited

U.S. PATENT DOCUMENTS 3,819,786 6/1974 May ........................................ 264/65
3,966,885 6/1976 May ................................. 156/89 X

FOREIGN PATENT DOCUMENTS 3128237 2/1983 Fed. Rep. of Germany ........ 264/59
1396773 6/1975 United Kingdom .................. 501/97

*Primary Examiner*—Helen M. McCarthy
*Attorney, Agent, or Firm*—James J. Ralabate

[57] ABSTRACT

Method produces reaction sintered silicon nitride complex shapes. Parent material (moldings of silicon powder-cured resin) and bonding or joint material (silicon powder-uncured resin) are integrally connected by steps of heat-curing the resin in the joint, heating the body thus bonded together to pyrolyze the cured resin and sinter the silicon powder, the pyrolysis gas reducing oxide film on silicon, and sintered parent material and joint material are simultaneously nitrided and integrally connected by continuous silicon nitride.

2 Claims, 2 Drawing Figures

METHOD FOR PRODUCING SILICON NITRIDE SINTERED BODY OF COMPLEX SHAPE

BACKGROUND OF THE INVENTION

1. Field of Industrial Applications

This invention relates to a method for producing silicon nitride ceramics of a complex shape by reactive sintering.

2. Prior Art

Silicon nitride and silicon carbide are finding more uses as a structural material owing to their superior heat resistance and corrosion resistance. However, because of their poor moldability, it is hard to manufacture an article having a complex shape. Therefore, in order to obtain a complex shaped article from silicon nitride and silicon carbide, it has to bond molded parts being simply shaped.

For achieving such bonding, several methods have been proposed such as bonding by a hot press, bonding with a bonding agent, and bonding by mechanical engagement. These bonding methods require complicated steps and results in high production cost. Moreover, they have drawback that the joints are weaker than the parent material. In the case of silicon nitride or silicon carbide, that is, non-oxide ceramics material, an adhesive like an alumina-based or silica-based adhesive that has been used for preparing oxide ceramics cannot be easily applied, because said non-oxide ceramics have a strong tendency toward covalent bonding and consequently are poor in wetting and reactivity with a molten material.

A silicon nitride sintered body of a complex shape may be considered to produce by bonding molded items made up mainly of silicon powder with a solvent-containing adhesive composed mainly of silicon powder, and then heating the assembly in a nitriding atmosphere. This method should provide a silicon nitride sintered body firmly bonded with a continuous joint phase of silicon nitride. In actual, however, the use of a solvent-containing adhesive causes cracking because the solvent infiltrates into the moldings to swell them.

OBJECT OF THE INVENTION

It is an object of this invention to provide a method for producing by reactive sintering a silicon nitride sintered body of a complex shape having a bond strength close to the strength of the parent material.

DETAILED DESCRIPTION OF THE INVENTION

Constitution of the Invention

Figure 1:
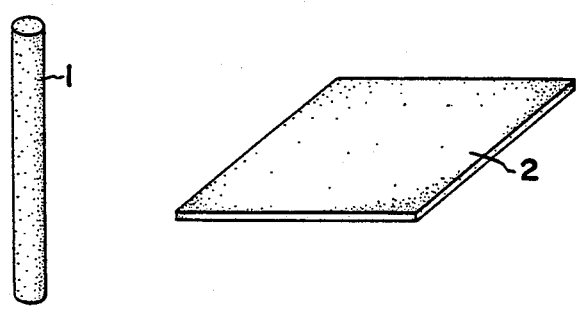
FIG. 1 shows moldings used in the example of this invention.

According to the method of this invention, a silicon nitride sintered body of a complex shape is produced by the following steps. At first, molding of comparatively simple shape are produced from a mixture of silicon powder and a resin which performs reducing action when thermally decomposed. These moldings are then heated to cure the resin therein, so that their subsequent handling is made easy. As many pieces of the moldings as required are bonded together with an adhesive composed of silicon powder and a resin and, if required, a solvent for the resin. The adhesive is dried and the resin in the adhesive is heat-cured, whereby the pieces of the moldings are made integral.

The resin in the adhesive should be one which liberates hydrogen and hydrocarbons for reducing action when thermally decomposed at 500° to 1200° C. in a non-oxidative gas atmosphere, and has a great shrinkage. Preferred examples of the resin include organosilicon polymer, phenolic resin, furan resin, xylene resin, epoxy resin, and unsaturated polyester resin.

The resin used in the moldings should be the same as the one used in the adhesive so that they have the equal shrinkage, or the two resins should have about the same shrinkage. Bonding in the molding stage is preferable from the standpoint of bond strength and heat economy, although it is possible to bond together calcined bodies or sintered bodies of silicon nitride ceramics with the above-mentioned adhesive.

The moldings thus bonded together are heated at 500° to 1200° C. in a non-oxidative gas atmosphere so that the resin is pyrolyzed. The pyrolysis gas having reducing action removes oxide film on silicon powder particles. After sintering, the sintered body of silicon powder is heated in a nitriding atmosphere. Thus there is obtained a silicon nitride sintered body of a complex shape.

EXAMPLES

Example 1

The raw materials used for the parent material were silicon powder having a particle diameter smaller than 50 $\mu$m and a particle size distribution for good packing, and organosilicon polymer or phenolic resin which perform reducing action upon thermal decomposition thereof.

The silicon powder and resin were thoroughly mixed by wet process according to the composition shown in Table 1. The mixture was dried, crushed, and pelletized to be a diameter smaller than 100 $\mu$m. The pellets were molded by a rubber press, followed by heat treatment in the atmosphere at 200° C. The molded articles were cut into test pieces measuring 30×30×5 mm.

The raw materials used for the adhesive were silicon powder having a particle diameter smaller than 50 $\mu$m and a particle size distribution for good packing ability, and organosilicon polymer and phenolic resin. The adhesive was composed of 80 wt% of silicon powder and 20 wt% of resin. They were mixed with an organic solvent to be a slip so that the resulting adhesive had a viscosity of 300 poise.

The adhesive was applied 0.3 to 0.5 mm thick to the joint of the molded item which had undergone heat treatment for curing. Thus there was obtained a bonded body.

The bonded body was dried and heated at 200° C. in the atmosphere so as to cure the resin in the adhesive. No damage caused by the solvent was observed as to thus obtained bonded body. In a comparative example in which the bonded body did not undergo the above-mentioned heat treatment, cracking occurred in the parent material.

The bonded body was finally synthesized by heating in nitriding atmosphere of nitrogen at 1500° C. for 3 hours to be a sintered body.

Thus obtained joint of the sintered body was examined under a scanning electron microscope. It was confirmed that a compact joint layer is formed and the parent material and the joint layer are integrally connected by continuous silicon nitride.

The bond strength of the bonded body was measured according to three-point bending test. The results are shown in Table 1. It is to be noted that the bond strength (bending strength) is close to that of the parent material. Also, the joint was examined for thermal shock resistance by repeating heating (1300° C.) and air cooling; but no change was recognized in the bonded portion.

The testing results were not changed even though resin used therein was changed to one such as furan resin, xylene resin, epoxy resin, and unsaturated polyester resin.

TABLE 1

| No. | Silicon powder (wt %) | Resin (wt %) | Resin in adhesive | Strength of parent material (kg/mm$^2$) | Bond strength (kg/mm$^2$) |
|---|---|---|---|---|---|
| 1 | 95 | 5 | A | 36–42 | 32–40 |
| 2 | 85 | 15 | A | 52–58 | 44–55 |
| 3 | 70 | 30 | A | 43–49 | 39–46 |
| 4 | 95 | 5 | B | 35–43 | 31–42 |
| 5 | 85 | 15 | B | 53–57 | 38–50 |
| 6 | 70 | 30 | B | 45–52 | 41–49 |

Note:
A: Organosilicon polymer
B: Phenolic resin

EXAMPLE 2

Figure 2:
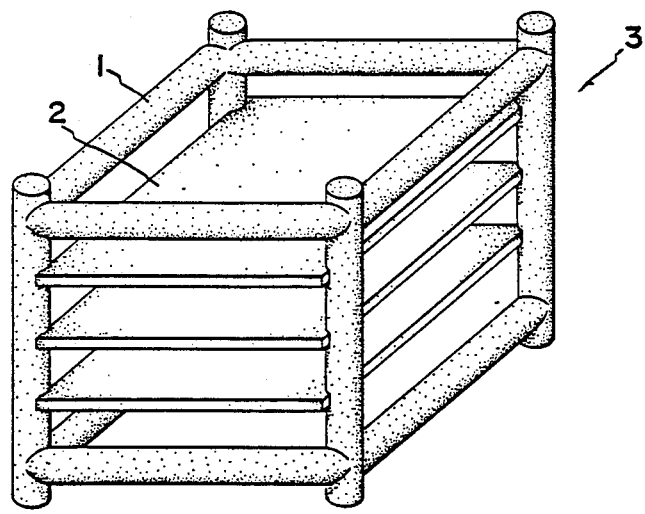
FIG. 2 shows an example of the bonded body.

Cylindrically molded and flat molded specimens as shown in FIG. 1 were prepared from pellets having the composition of No. 2 in Table 1. They were heated at 200° C. in the atmosphere for curing, and then fabricated into a prescribed shape. They were joined together using the same adhesive as used for No. 2 in Table 1 to give an item as shown in FIG. 2. After drying and heat treatment at 200° C. in the atmosphere, it was heated under the same condition as in Example 1. Preferred bonding conditions were obtained as in Example 1.

Effect of the Invention

The advantages of this invention are as follows:

(1) The heat curing of the resin by thermal polymerization in the moldings makes the moldings easy to handle and fabricate. Good bonding is obtained without damage resulting from the solvent in the adhesive swelling the moldings. The heat treatment can be accomplished with a simple apparatus because the heat curing of the resin takes place at 100° to 400° C. Thus the curing of the moldings can be controlled by adjusting the treating temperature and time.

(2) Bonding is achieved by interposing a solvent-containing adhesive between adherent surfaces; therefore, an object of complex shape can be produced easily. The adhesive may be applied or cast to the adherent surface depending on the situation. The viscosity of the adhesive is adjusted by changing the amount of solvent, so that proper wetting takes place between the adhesive and the parent material. A proper viscosity may be established according to workability required for the specific structure of joints. The solvent-containing adhesive provides a compact joint layer and permits the thickness of the joint layer to be controlled easily.

(3) Upon heat curing, the resin contained in the adhesive helps achieve firm bonding of moldings. The integrated moldings are easy to handle.

(4) The sintering of silicon powder is easily accomplished by the use of a resin which liberates hydrogen and hydrocarbons for reduction upon pyrolysis at 500° to 1200° C. and has a great shrinkage.

(5) Silicon powder as the major component of the adhesive undergoes sintering and nitriding simultaneously with that in the parent material. Therefore, the parent material and the bond layer are firmly connected by silicon nitride having continuous phase. This provides the bond strength which is almost equal to the strength of the parent material. The bond layer has the same structure as the parent material, and it is chemically stable.

(6) The parent material (moldings) and the bond layer are nitrided simultaneously. This simplifies the steps and apparatus.

What is claimed is:

1. A method for producing a silicon nitride sintered body of a complex shape which comprises interposing a bonding agent composed of silicon powder and resin on bonding faces of each separate molded body composed of silicon powder and solvent-insoluble cured resin, integrating said molded bodies at their bonding faces by heat-curing the resin in said bonding agent, heating the integrated body of the molded bodies thus bonded together at 500° to 1200° C. in a non-oxidizing gas atmosphere so that the resin is pyrolyzed and the silicon particles form a sintered body, and nitriding said integrated silicon body by heating at 1200° to 1500° C. in a nitriding atmosphere, the resin being one which performs reduction action when thermally decomposed and has a great shrinkage.

2. A method for producing a silicon nitride sintered body of complex shape as claimed in claim 1 wherein the resin is one which liberates hydrogen and hydrocarbons upon heating at 500° to 1200° C. in an atmosphere of non-oxidizing gas.

* * * * *